Aug. 10, 1943.  E. C. NICHOLIDES  2,326,246
SPEED INDICATING AND RECORDING DEVICE
Filed Jan. 7, 1942   5 Sheets-Sheet 4
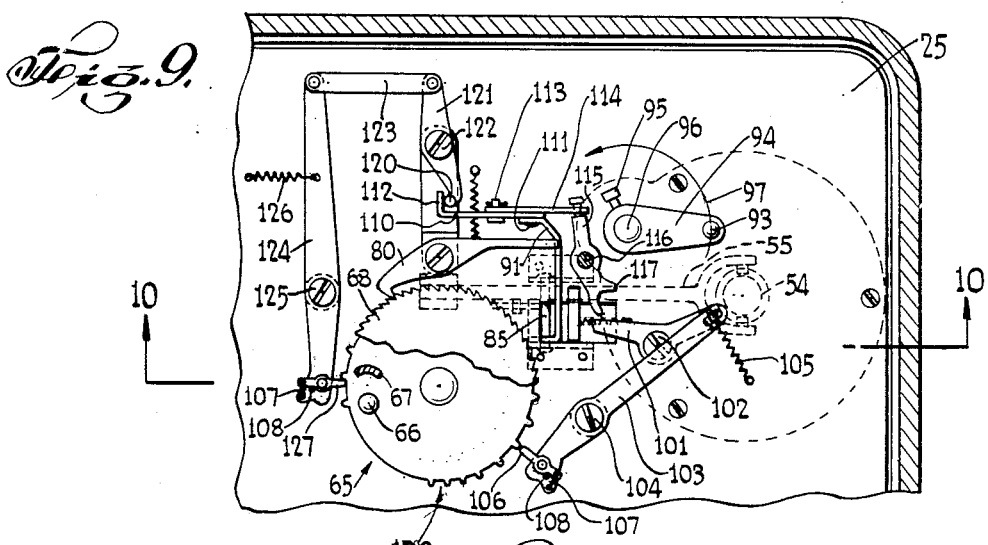
Fig. 9.
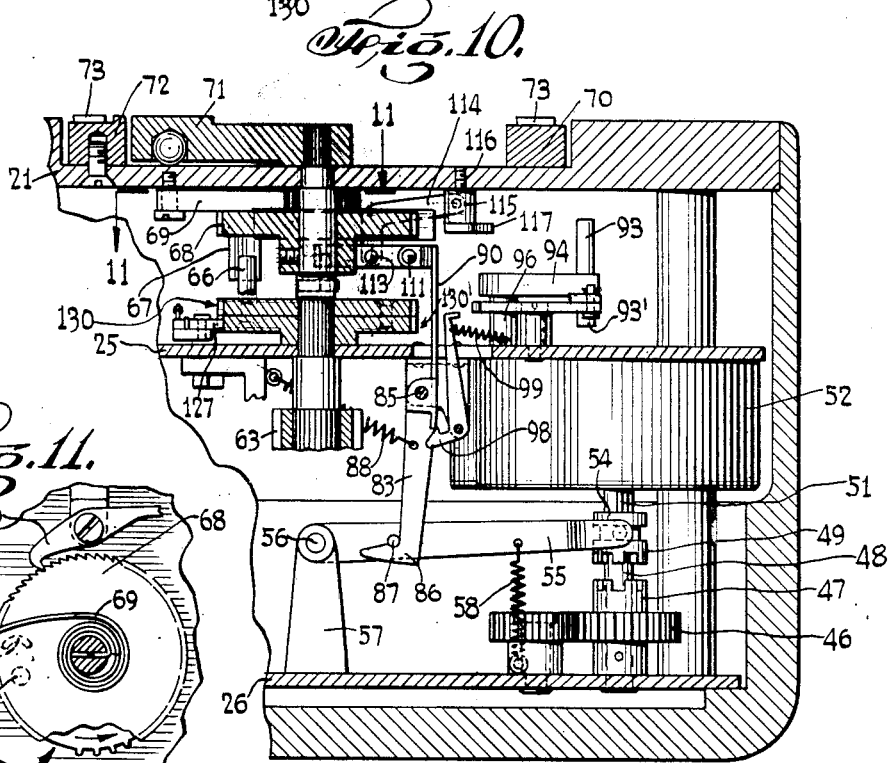
Fig. 10.
Fig. 11.
INVENTOR
E. C. NICHOLIDES
BY S. M. Prueless
ATTORNEY

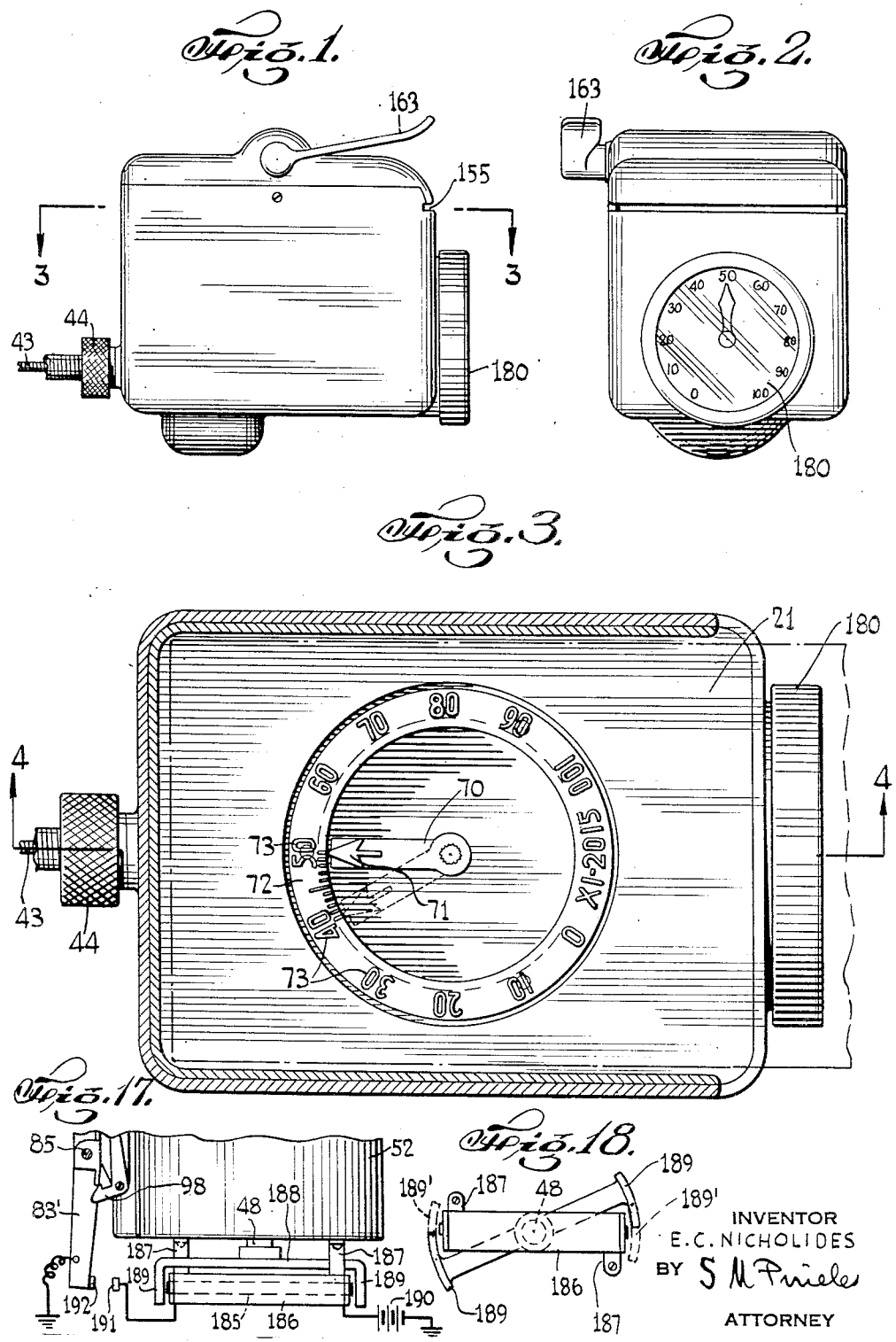

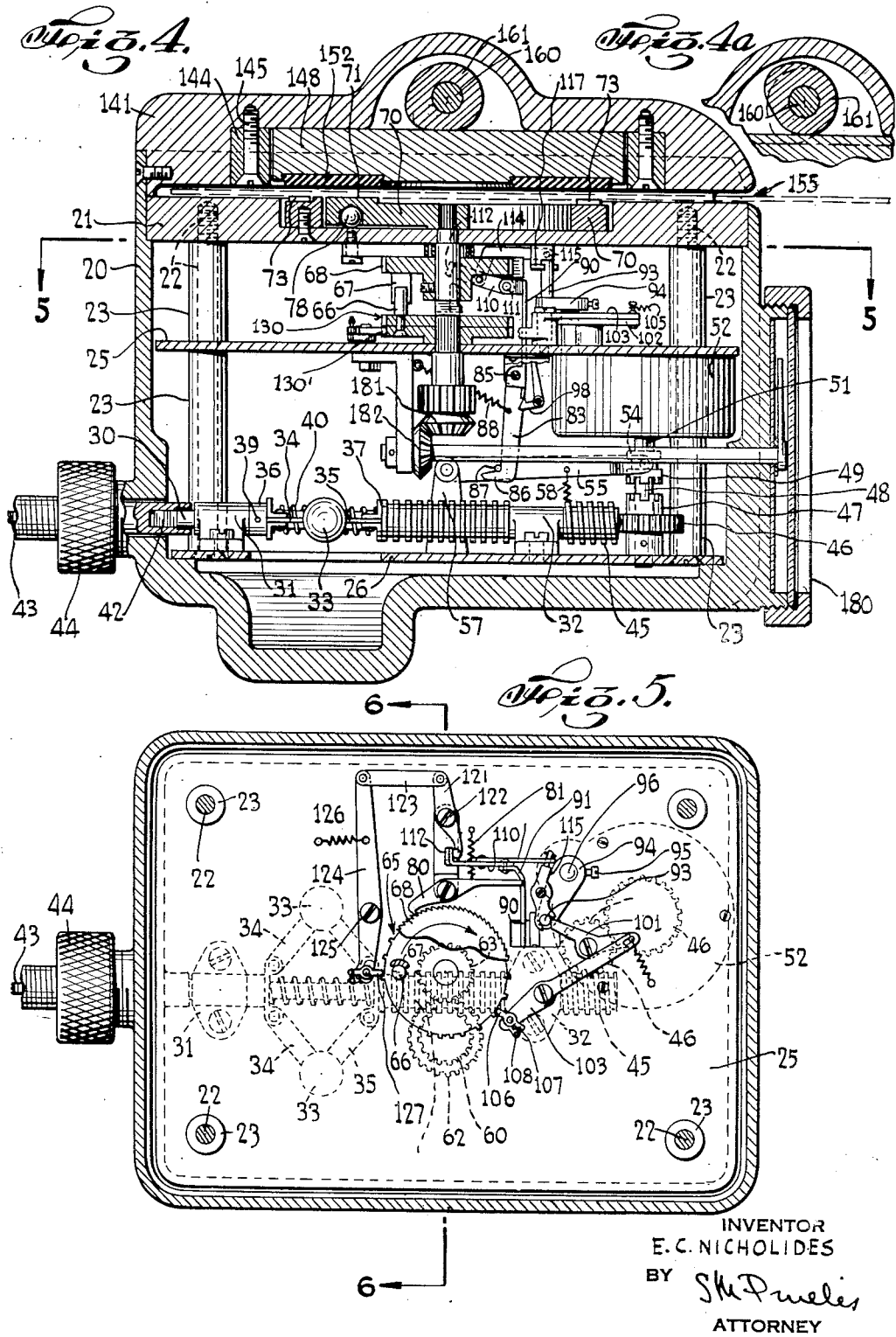
Aug. 10, 1943.  E. C. NICHOLIDES  2,326,246
SPEED INDICATING AND RECORDING DEVICE
Filed Jan. 7, 1942   5 Sheets-Sheet 2
INVENTOR
E. C. NICHOLIDES
BY
ATTORNEY

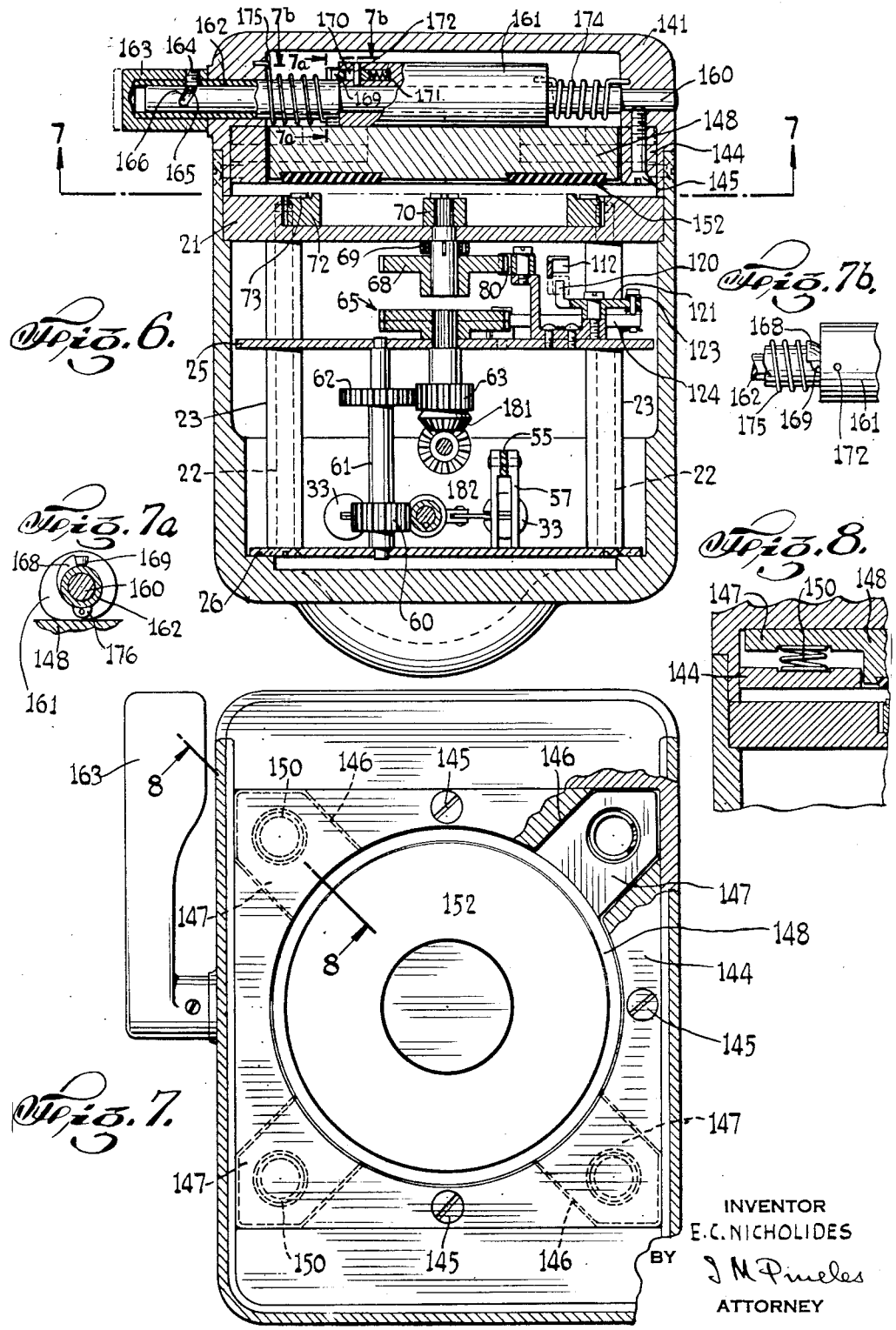

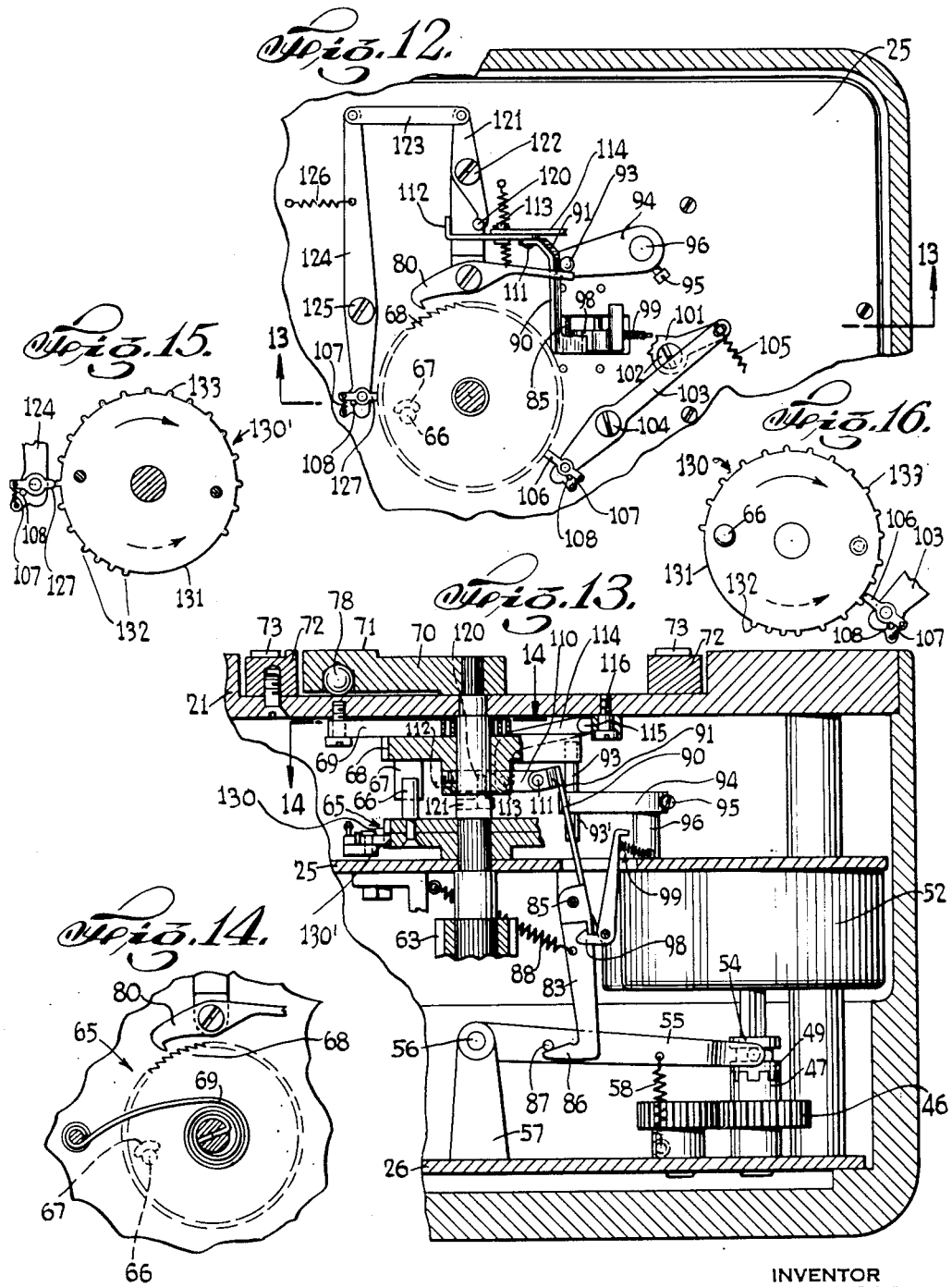
Aug. 10, 1943. E. C. NICHOLIDES 2,326,246
SPEED INDICATING AND RECORDING DEVICE
Filed Jan. 7, 1942 5 Sheets-Sheet 5
INVENTOR
E. C. NICHOLIDES
BY S M Prioles
ATTORNEY Patented Aug. 10, 1943

2,326,246

UNITED STATES PATENT OFFICE 2,326,246

SPEED INDICATING AND RECORDING DEVICE

Emmanuel Christ Nicholides, Chicago, Ill.

Application January 7, 1942, Serial No. 425,828

20 Claims. (Cl. 234—58)

This application is a continuation-in-part of applicant's application Serial No. 246,320, filed December 17, 1938.

This invention relates to speed measuring and recording devices and it has among its objects a device for giving an indication or measurement of the maximum speed reached by a moving body, such as a motor vehicle, in combination with time action means for retaining the maximum speed indication for a predetermined timing action period correlated to the occurrence of a speed decrease; and the combination of such measuring or indicating device with means for recording such maximum speed indication.

The foregoing and other objects of the invention will be best understood from the following description of an exemplification thereof illustrated in the accompanying drawings, wherein Fig. 1 is a side view of the assembled speed indicating and recording device exemplifying one form of the invention;

Fig. 2 is a front view of the device;

Fig. 3 is a plan view of the device with the cover removed;

Fig. 4 is a vertical cross-sectional view of the device along line 4—4 of Fig. 3;

Fig. 4a is a detailed cross-sectional view of the printing mechanism along line 4a—4a of Fig. 6;

Fig. 5 is a partial horizontal sectional view of the enclosed mechanism along line 5—5 of Fig. 4;

Fig. 6 is a vertical sectional view along line 6—6 of Fig. 5;

Fig. 7 is a horizontal sectional view along line 7—7 of Fig. 6;

Fig. 7a is a cross-sectional view along line 7a—7a of Fig. 6;

Fig. 7b is a longitudinal view along line 7b—7b of Fig. 6;

Fig. 8 is a detailed cross-sectional view of a portion of the cover structure along line 8—8 of Fig. 7;

Fig. 9 is a view similar to Fig. 5 indicating another operating condition of the mechanism;

Fig. 10 is a vertical cross-sectional view along line 10—10 of Fig. 9;

Fig. 11 is a detailed cross-sectional view along line 11—11 of Fig. 10;

Fig. 12 and Fig. 13 are views similar to Figs. 9 and 10, respectively, under a different operating condition;

Fig. 14 is a detailed cross-sectional view along line 14—14 of Fig. 13;

Fig. 15 is a vertical view of the indicator driving disc cam periphery used for starting the timing action;

Fig. 16 is a view similar to Fig. 15 of the cam path used for starting a supplemental timer rewinding action;

Fig. 17 is a view similar to Fig. 13 showing an electro-magnetic rewinding mechanism for the device of Figs. 1 to 13; and Fig. 18 is a bottom view of parts of the electro-magnetic mechanism of Fig. 17.

Many attempts have been made in the past to provide a simple and foolproof device that could be relied upon for preserving the record of a maximum speed measurement of a vehicle for a certain time after the driver has reduced the speed of the vehicle, so as to enable, for instance, a traffic officer who stops the vehicle to secure a conclusive proof of the maximum speed of the vehicle during a speeding period before it was brought to a stop.

The device of the invention solves this problem by providing a device for measuring the maximum speed acquired by a moving vehicle, and retaining this maximum speed measurement for a predetermined period of time, for instance, one or more minutes, following the reduction of the speed.

The measuring device of the invention is so arranged that an officer who stops a speeding vehicle is able to determine from the retained measurement the maximum speed at which the vehicle has traveled before it was brought to a stop. In addition, the speed measuring device of the invention is combined with a recording mechanism which enables the traffic officer to make a permanent record of the maximum speed measurement of the vehicle before it was brought to a stop. One copy of such record may be given to the driver of the vehicle as a summons, and other copies may serve as court records.

By using a timing mechanism for retaining the maximum speed measurement during a predetermined time following the reduction of the speed, prompt action on the part of the traffic officer in making a record of the measurement is assured because the traffic officer has to make the imprint of the measured maximum speed before the expiration of the timing period during which the measurement is retained.

A distinct feature of the invention is the arrangement which assures that under all conditions, a maximum speed measurement is retained for the full duration of the predetermined timing action period given the traffic officer to stop the vehicle. Thus, for instance, if a motorist first notices the traffic officer while he decreases the speed following an immediately previous speeding venture and again starts to increase the speed so as to delay the officer in catching the car while its timing mechanism keeps preserving the previous maximum speed measurement, the mechanism of the invention resets itself and automatically prolongs the timing period as long as the speed increase which follows the speed decrease was started before the end of the predetermined timing period. The foregoing features of the invention will be fully explained in connection with the following description of exemplifications thereof.

The exemplification of the invention shown in the drawings comprises a casing 20 of cast metal, for instance, provided with a mounting plate 21 suitably seated on the flanged edge of the casing, to which are attached by means of four screws 22 and spacer posts 23, two additional mounting plates 25, 26 fitting the interior of the casing.

As shown in Fig. 4, on a governor shaft 30 journaled in bearings 31, 32, secured to the inward mounting plate 26, is mounted a centrifugal governor formed by governor weights 33 linked by links 34, 35 to two collars 36, 37 seated on the shaft 30, collar 36 being affixed to the shaft, as by means of a pin 39, and the other elongated collar 37 being free to slide on the shaft so that the centrifugal action of the governor weights moves the collar 37 along the shaft toward the collar 36 against the action of the spring 40 to a position corresponding to the momentary speed imparted to the shaft 30.

One end of the shaft is provided with a squared portion 42 arranged for coupling to the end of a flexible shaft 43 by means of a coupling member 44 threadedly fitting over a nipple extending from the casing 20. The other end of shaft 30 is provided with a worm 45 which drives a gearing 46 of a clutch member 47 revolvably mounted on a shaft 48 on which is slidingly mounted a clutch member 49 which is keyed to the winding shaft 51 of a timer mechanism, such as a clockwork 52, mounted on the intermediate mounting plate 25 so that when the clutch members 47, 49 are in coupling engagement, the rotation of the governor shaft winds the timer clockwork 52.

As shown in Figs. 4, 6 and 10, the slidable clutch member 49 is provided with a grooved collar 54 engaged by the forked end of a supporting arm 55 suitably pivoted on a pedestal 57, so that under the action of a biasing spring 58, the supporting arm 55 moves the clutch member 49 into coupling engagement with the gear driven clutch member 47 for winding the clockwork of the timer 52. By lifting the supporting arm 55 against the action of the spring 58, the coupling engagement between the driving gear and the winding mechanism may be broken.

The momentary position of the longitudinally slidable collar 37 is determined by the speed of rotation imparted to the governor shaft 30 by the flexible shaft 43. The surface of this slidable collar 37 is provided with circular teeth which, as shown in Fig. 6, are arranged to engage a gear wheel 60 mounted on a shaft 61 supported between the mounting plates 25, 26 for turning through the engagement of its gear 62 with the gear 63, a vertically journaled shaft of an indicator driving disc 65 having a periphery provided with cam-like teeth 64. As a result, the angular position of the disc 65 corresponds at all times to the momentary speed imparted to the governor shaft 30 by the flexible shaft 43 which in turn corresponds to the speed of the vehicle with which the apparatus is associated.

As shown in Figs. 4 and 5, the indicator driving disc 65 has a driving pin 66 arranged to engage a projecting lug 67 of an indicator ratchet wheel 68 which is pivotally mounted in the outer mounting plate 21 and biased by a spiral spring 69 to maintain the ratchet wheel lug 67 in engagement with the indicator driving pin 66. As a result, the indicator ratchet wheel 68 will follow the rotation of the indicator disc 65 as it moves clockwise for an increase in speed, and counter-clockwise for a decrease in speed. The upwardly projecting end of the ratchet wheel shaft carries an indicator arm 70, which, as shown in Fig. 3, has a raised pointer portion 71 cooperating with a circular scale 72 having raised dial numerals 73 on which the pointer 71 indicates the speed of the vehicle. The indicator arm 70 with its pointer 71 rides on a ball 78 which rolls over the underlying surface portion of the mounting plate 21 so as to reduce the friction and provide a support for the indicator 70.

As shown in Figs. 5, 6 and 9, the indicator ratchet wheel 68 is arranged for cooperation with a pivotally mounted ratchet pawl 80 biased by a spring 81 so as to retain the ratchet wheel 68 and the indicator 70 in a maximum speed position to which the indicator 70 was advanced.

The operation of the ratchet pawl 80 as well as of the timer, are controlled by a special control mechanism, one form of which will now be described. It comprises a clutch lever 83 pivotally mounted at 85 and having at its downward end a hook-shaped cam member 86 arranged for cooperation with the cam pin projection 87 of the clutch support 55 so arranged that when the clutch lever 83 is tilted from the position shown in Fig. 4 against the biasing action of the spring 88 to the position shown in Fig. 13, the clutch support 55 is pulled by its biasing spring 58 to the position in which the timer driving gear 46 is coupled to the timer winding shaft 51 and the timer clockwork 52 is wound up; and that when under the action of its biasing spring 88, the control lever 83 is returned from the position shown in Fig. 13 to the position shown in Fig. 4, the cam hook 86 acting on the cam pin 87 of the clutch support lifts the clutch support to the raised position shown in Fig. 4 for breaking the coupling connection between the timer winding shaft 51 and its driving gear 46.

As shown in Figs. 4, 5, 9 and 10, the clutch control lever 83 has an upwardly projecting actuating arm 90 having a bent portion 91 shaped for engagement with a timer pin 93 extending from a timer arm 94 clamped by a screw 95 to the projecting shaft 96 of the timer mechanism 52 so that when the clockwork of the timer is released, the timer arm 94 rotates the timer pin 93 from its normal full wound-up position, shown in Fig. 5, along the path indicated in Fig. 9, to its end position shown in Fig. 12. The several cooperating elements of the clutch lever arm 90, the ratchet wheel pawl 80, and the timer pin 93 are so shaped and arranged that as the timer arm 93 reaches its end position shown in Fig. 12, it trips the ratchet pawl 80 to release the ratchet wheel 68 and permit it, with its indicator arm 70, to be moved by its biasing spring 69 towards the indicator driving pin 66; and, in addition, the timer pin 93 exerts on the cooperating portion 91 of the clutch lever arm 90 a force which tilts the clutch lever 83 to a position where its cam end 86 releases the clutch support pin 87 to permit the biasing spring 58 to couple the clutch members 47, 49 and establish a driving connection between the timer winding shaft 51 with its winding gear 46 for rewinding the timer clockwork and return the timer trip pin 93 from its end position shown in Fig. 12 toward the normal wound position shown in Fig. 5.

The clutch operating lever 83 is retained in its tilted coupling position shown in Fig. 13 by a pivotally mounted latch lever 98 which is biased by a spring 99. The several springs 58, 88, 99 acting on the clutch support 55, the clutch lever 83, and the clutch latch 93 are so proportioned that when the clutch lever 83 is released from its engagement with the latch 98, the spring 88 has sufficient tension for returning the clutch lever 83 from the position shown in Fig. 13 to the position shown in Fig. 4 so as to lift the clutch member 49 from its coupling engagement with clutch member 47 and break the driving connection of the winding gear 46 to the timer winding shaft 51; but to retain the clutch lever 83 in the coupling position shown in Fig. 13 as long as the latch 98 engages the latch catch of the clutch lever 83 in the way shown in Fig. 13.

In order to lock the timer pin 93 in its normal fully wound position shown in Fig. 5 and prevent the clockwork from turning the timer pin 93 to the position shown in Fig. 12, there is provided a timer lock lever 101 pivoted at 102, and actuated by an actuating lever 103 that is pivoted at 104 and biased by a spring 105 to press a follower pin 106 at the free end of the actuating lever 103 against the periphery of the indicator driving disc 65. A follower pin 106 is pivotally mounted on the free end of the actuating lever 103 and is biased by a spring 107 toward a stop 108 so as to leave the actuating lever 103 unaffected when the indicator driving disc 65 rotates clockwise under conditions of increasing speed, but to be actuated by cam teeth 64 of the indicator driving disc 65 to tilt the actuating lever 103 so as to turn the timer lock lever 101 out of the path of the timer pin 93 to release it from the locked position, thereby releasing the timer for performing its timer action in turning the timer pin 93 from the position shown in Fig. 5 to the position shown in Fig. 12 only when the speed of the vehicle starts to decrease.

The junction between the timer lock lever 101 and its actuating lever 103 and the biasing spring 105 are so arranged that when the timer clockwork is fully wound and returns the timer pin 93 from the position shown in Fig. 12 back to the position shown in Fig. 5, the timer pin 93, in approaching its locked position, moves past the locking end of its lock lever 101 against the action of its biasing spring 105 until it locks itself in the position shown in Fig. 5. At the same time, the downward timing pin extension 93' in returning to its normal position shown in Fig. 5 tilts the clutch latch lever 98 to release the clutch lever 83 and permit it to be returned by its biasing spring 88 to its position shown in Fig. 4 in which the timer winding gear 46 is uncoupled from the timer winding shaft 51.

In order to assure that the clockwork is rewound under conditions when a decrease of the speed of the vehicle is followed by a speed increase before the completion of the full timing period, there is provided a supplemental coupling actuating arrangement for coupling the timer winding shaft 51 to its winding gear 46 if the speed of the vehicle is increased at any time before the timer pin reaches its final position, shown in Fig. 12. The supplemental coupling actuating arrangement comprises a clutch arm extension 110 pivotally mounted at 111 on the offset end of the clutch lever arm 90 and provided with a hooked end 112 arranged to be pivoted on its pivot 111 from its downward position shown in Figs. 10 and 13 to its upward position shown in Figs. 4 and 6. The up and down motion is imparted to the clutch lever arm extension 110 through its pivotal connection at 113 to a link 114 carried on one end of a rocker 115 which is pivotally mounted at 116 (Fig. 13) on the under side of the outer mounting plate 21 and has at its other end a forked cam portion 117 so arranged that when the timer pin returns to its locked position shown in Fig. 5, the rocker 115 lifts through its link 114 the clutch arm extension 110 to the upward position shown in Figs. 4 and 6; and that when the timer pin starts from its locked position shown in Fig. 5 on its timing action toward the position shown in Fig. 12, the rocker 115 is tilted to the position shown in Fig. 9 for actuating its link 114 to tilt the clutch lever arm extension 110 to its downward position shown in Fig. 13.

The hooked end 112 of the clutch arm extension 110 is arranged to be actuated, in its lowered position shown in Fig. 12, by an actuating pin 120 of a lever 121 pivoted at 122 and connected through a link 123 to an actuating lever 124 which is pivoted at 125 and biased by a spring 126 to hold a follower pin 127 in engagement with the periphery of the indicator driving disc 65. The follower pin 127 is pivotally mounted on the free end of the actuating lever 124 and is in a way analogous to the follower pin 106, biased by a spring 107 toward a stop 108, to leave its actuating lever 124 unaffected when the speed decreases, and be actuated by the cam teeth 64 of the indicator driving disc 65 to tilt its actuating lever 124 against the action of a biasing spring 126 only when the indicator driving disc 65 is rotated under conditions of increasing vehicle speed so as to operate through link 123 the lever pin 120 of lever 121 to apply to the hooked end 112 of the clutch lever arm extension 110 a force which turns the clutch lever 83 to its latched coupling position shown in Fig. 13 for coupling the timer winding shaft 51 to its winding gear 46 and rewinding the timer clockwork 52 each time a speed increase takes place while the timer pin 93 is on its way from the position shown in Fig. 5 to the position shown in Fig. 12.

The special interlocking arrangement between the timing pin 93 and the clutch lever arm extension 110 through the medium of the rocker 115 automatically assures that the clutch lever arm extension 110 is automatically tilted out of the path of its actuating pin 120 so that the supplemental action of coupling the timer winding shaft 51 to the coupling gear 46 takes place only when the timer pin is not in its locked position shown in Fig. 5 but is carrying out its timing action on its way to the position shown in Fig. 12; and such supplemental clockwork winding operation will be started only if a speed increase follows a speed decrease before the timer action has been completed.

Although the entire cam-like periphery 64 of the indicator driving disc 65 may be provided with cam teeth for operating in the way described above over the entire speed range, the form of the invention, applied to commercial vehicles, such as automobiles, may be provided with an indicator driving disc 65 having two cam paths 130, 130' as shown in Figs. 15 and 16, one for engagement with the follower pin 106 of the actuating arm 103 which controls the timer tripping lever 101, and one for engagement with the follower pin 127 which controls through its actuating arm 124 the supplemental coupling of the timer winding shaft 51 to its winding gear 46.

As shown in Figs. 15 and 16, the circular periphery of each follower path 130, 130' is provided with a section 131 which is engaged by the follower pin while the speed of the vehicle is within one predetermined speed range, for instance, the low speed range between 0 and 25 miles; a peripheral portion 132 which is engaged by the follower pin when the speed of the vehicle is at the next higher range, for instance, a medium speed range between 25 miles and 35 miles; and an additional peripheral section 133 with which the follower pin is maintained in engagement in the next higher speed range, for instance, high speed range between 35 miles up to 100 miles.

The peripheral section 131 for the low speed range up to 25 miles has no cam teeth, so that an increase of the speed up to 25 miles has no effect on the operation of the timer mechanism. As a result, the indicator arm remains retained by its ratchet wheel 68 in its last maximum speed position in the low speed range as long as the speed is in the low speed range, irrespective of the actual speed of the car and the corresponding position of the indicator driving disc 65.

The peripheral section 132 corresponding to the medium speed range has relatively narrow teeth so that each change of speed of 3 miles, for instance, moves one tooth past the follower pin for actuating its associated mechanism to perform the corresponding operations of the timer mechanism and its controls. The peripheral section 133 of the indicator driving gear 65 has teeth of a larger pitch so that a change in speed in this higher speed range actuates its follower pin, only every 5 miles, for actuating the timer mechanism and its control arrangement in the way described above.

As long as the speed of the vehicle is in the low speed range, corresponding to the peripheral section 131 of the indicator driving disc 65, the indicator driving pin 66 will advance the indicator ratchet wheel 68 and therethrough the indicator 70 to the maximum speed position reached within this range, the indicator being retained at the maximum speed reached in this lower speed range by the ratchet pawl 80. The timer 52 is fully wound and the timer pin 93 remains in its normal locked position shown in Fig. 5. The clutch lever 83 holds the timer winding clutch 49 uncoupled, and the rotation of the governor shaft 30 does not in any way affect the timer mechanism and the elements associated therewith.

As soon as the speed of the car is increased to a value higher than the low speed range corresponding to the peripheral section 131 of the indicator driving disc 65, the operation of the mechanism will be as follows:

The indicator disc 65 with its driving pin 66 will engage the driving lug 67 of the indicator ratchet 68 and advance the indicator 70 to the maximum speed reached by the vehicle, in which the indicator will be automatically retained through the engagement of the ratchet pawl 80 with the indicator ratchet 68 as shown in Figs. 4, 5 and 6. The timer is fully wound and the timer pin remains locked by its lock lever 101 in the position shown in Fig. 5, keeping through its engagement with the cam end 117 of the rocker 115 the clutch lever arm extension 110 in the raised position shown in Figs. 4 and 6.

If the speed of the vehicle is now decreased, the indicator driving disc 65 will turn counterclockwise to a position corresponding to the lower running speed of the vehicle, while the indicator is retained by the ratchet pawl 80 in the previously reached maximum speed position. The backward turn of the indicator disc 65 will cause its toothed periphery engaged by the follower pin 106 to tilt its actuating arm 103 so as to turn the timer locking lever 101 thereby unlocking the timer pin 93 and starting its progressive rotation from the position shown in Fig. 5 to the position shown in Fig. 9. As the timer pin starts its progressive motion from the position shown in Fig. 5, it also swings the rocker 115 from the position shown in Fig. 5 to the position shown in Fig. 9 for tilting through its link 114 the clutch lever arm extension 110 to the downward position shown in Figs. 10 and 13.

Throughout the timing period, during which the timer pin 93 travels from its starting position shown in Fig. 5 to its end position shown in Fig. 12, as determined by the setting of the clockwork 52, for instance, one minute, the indicator 70 remains latched in its previously reached maximum speed position. At the end of the timing period, the timer pin 93 reaches its end position shown in Figs. 12 and 13, and in doing so the timer pin 93 trips the pawl 80 of the indicator ratchet 68 to release the indicator pin from its previously reached maximum speed position and to permit it to be turned back by its spring 69 until the ratchet wheel lug 67 comes into engagement with the momentary speed position of the indicator driving disc 65. In reaching its end position shown in Fig. 12, the timer pin 93 also comes into engagement with a portion 91 of the clutch lever arm 90 and actuates it to tilt the clutch coupling lever 83 to the coupling position shown in Fig. 13, in which it is locked by the locking lever 98 for coupling the timer winding shaft 51 to the timer driving gear 46 so as to rewind the timer clockwork 52 and return the timer pin 93 from the end position shown in Figs. 12 and 13 back toward the fully wound starting position shown in Fig. 5.

In reaching its fully wound starting position shown in Fig. 5, the timer pin 93 comes into engagement with its locking lever 101 so as to lock itself in starting position, and it also returns the rocker 115 from the position shown in Fig. 9 to the position shown in Fig. 5. In addition, the lower timer pin portion 93' trips the clutch locking lever 98 against the biasing action of its spring 99 so as to release the clutch coupling lever 83 and permit its biasing spring 88 to return the coupling lever 83 from the coupling position shown in Fig. 12 to the uncoupling position shown in Figs. 4 and 10, and thereby break the coupling between the timer winding shaft 51 and its winding gear 46.

Should a speed increase follow a speed decrease before the completion of the predetermined timing period, for instance, while the timer pin 93 is in the position shown in Fig. 9, the toothed periphery of the indicator driving disc 65 will move in clockwise direction and actuate the follower pin 127 to tilt the lever 124, which through link 123 and lever 121 moves the lever pin 120 against the lowered hooked end 112 of the clutch arm extension 110 so as to actuate the clutch lever 83 to release the clutch support 55 and couple the timer winding shaft 51 with its driving gear 46 for rewinding the clockwork and returning the timer pin 93 to its starting position of Fig. 5. In this way, there is assured at all times that the indicator will remain in its last maximum speed position of the higher speed range at least for the full timing period as determined by the timing mechanism.

All of the elements of the maximum speed measuring device described above in connection with Figs. 1 and 2 are formed of simple parts used in standard speed measuring and indicating devices and alarm clocks. Such maximum speed indicating device may be also arranged to operate the usual speed indicator which may be mounted in one of the walls of the casing and driven through suitable gearing by the driving shaft 30.

The maximum speed indicating device of the type described above may be mounted on the dashboard of a car so that its indicator 71 with the scale 72 shall be exposed to view, being suitably enclosed by a transparent cover of plastic material, for instance. A traffic officer provided with a standard camera, on stopping the car, would merely have to snap a picture of the indicator 70 and scale 73 with the vehicle identification No. X1–2015, for instance, as shown in Fig. 3, in order to make a conclusive record of the maximum speed at which the car was travelling during the period immediately before it was brought to a stop. Such record would supply a positive proof of the maximum speed at which the vehicle travelled before it was brought to a stop and would eliminate the differences of opinion that arise between a traffic officer and the motorist as to the guilt of the motorist or the actual speed of the vehicle, the record of the maximum speed being conclusive.

Such speed indicating device will also frequently save the motorist from paying fines, by rendering impossible biased charges and testimony of speeding by a hostile traffic officer. The conclusive and indisputable proof as to whether the motorist is guilty or innocent supplied by such record will also save much time in trying cases.

A distinct phase of the present invention is the arrangement and utilization of the maximum speed measuring device so as to make it possible to facilitate imprinting of the record of the maximum speed indication on simple duplicate slips of paper, such as the traffic violation ticket ordinarily handed by the traffic officer to a driver of a vehicle.

In Figs. 1, 2, 3, 4, 4a, 6, 7, 7a, 7b and 8 is shown one form of a recording mechanism for enabling simple and quick recording of the speed indication as well as identifying or other pertinent data that would be useful in establishing a permanent record of the speed at which the particular vehicle travelled at a certain time, for instance, when it was first observed by a highway patrol.

In the form shown in the drawings, the recording mechanism is mounted in a cover member 141 which is secured to the casing 20 above the mounting plate 21 with its indicator 70 and scale 73. In a hollow cover compartment facing the indicator scale 73 is mounted a guide plate 144 held, for instance, by screws 145, and provided with guide grooves 146 for guiding arms 147 of a platen 148 movable in a direction towards the indicator scale 73. The platen 148 is normally held in a raised position by helical springs 150 placed between the guide arms 147 of the platen and the underlying portions of the guide plate 144. In shallow annular channel of the platen 148 facing the indicator scale 73 and the pointer 71 is seated a yieldable compression ring 152 of rubber, for instance.

The cover member 141 is so shaped and arranged as to form a slit 155 between the exposed face of the mounting plate 21 with its scale 73 and the facing surfaces of the cover member 141 and the platen 148, to permit insertion of a sheaf of one or more leaves of printing material, such as paper, into the space facing the scale and the pointer. Such sheaf of papers may consist, for instance, of duplicate or triplicate copies of a summons directing the operator of the vehicle to answer for a speed violation, and the sheets may be combined with the carbon backings so that when the platen presses the sheaves towards the indicator scale 73, a permanent record will be imprinted upon the sheaves showing the maximum speed of the vehicle as indicated by the pointer on the scale, and also an identifying legend, such as the serial number of the meter or the motor number of the car.

The actuating mechanism for the printing plate 148 comprises a shaft 160 extending through the cover compartment, an eccentric sleevelike hammer member 161 revolvably mounted on the shaft 160 and an actuating sleeve 162 mounted for revolvable and sliding movement on the outwardly projecting portion of the shaft 160. On the outwardly projecting end of the sleeve is mounted a handle 163 which, as shown in Fig. 6, is locked to the sleeve by a screw 164 having an inwardly projecting guide key 165 shaped to engage a guide slot 166 of the shaft 160 so that when the actuating sleeve 162 is rotated by the handle 163, it slides outwardly along the shaft 160.

The inward end of the actuating sleeve 162 has a driving claw 168 which engages a latch pin 169 slidably mounted in a longitudinal cavity 170 of the sleeve and pressed outwardly by a spring 171 against a stop pin 172 extending through a slot of the latch pin 169. The hammer sleeve 161 is held in the position shown in Fig. 4 by a relatively stiff torsion spring 174. The actuating sleeve 162 is normally held in the position shown in Fig. 6 by a relatively flexible spring 175 having its ends locked in the cover member 141 and in a lug 176 of the actuating sleeve 162 so as to bias the handle 163 to its inward position as shown in Figs. 6 and 1. The cooperating elements of the hammer sleeve and the actuating sleeve are so arranged that when the handle is turned against the biasing action of the spring 175, the driving claw 168 of the actuating sleeve engages the latch 169 of the hammer sleeve and turns it while at the same time winding its torsion spring 174 and storing therein spring energy for actuating the hammer sleeve 161. The driving claw 168 and the latch 169 are so located in relation to the guide slot 166 on the shaft 160, that near the end of the rotation of the actuating sleeve 162, the outward motion of the sleeve withdraws its claw 168 from its engagement with the latch 169 of the hammer sleeve 161 to release the hammer sleeve 161. Thereupon, the energy stored in the torsion spring 174 discharges the hammer sleeve 161 against the printing platen 148 with a predetermined impact force against the sheaf of papers inserted into the slot 155 for performing a printing operation without causing any damage to the underlying indicator mechanism. Upon performing the printing operation, the printing platen is automatically returned to its raised position by the springs 150. The rear surfaces of the actuating sleeve claw 168 and of the hammer sleeve latch 169 are so shaped that when the handle 163 is released and its biasing spring 175 returns it to its normal position, the latch pin 169 is pushed inwardly into its sleeve slot 170 to permit the driving claw to return to its normal position.

The maximum speed indicating and recording device described above may be also used for operating the usual speed indicator 180 which may, for instance, be mounted in one of the side walls of the casing and driven through suitable gearing 181, 182 by the indicator disc driving shaft in the way indicated in Fig. 4.

Various types of mechanisms may be utilized for constructing a speed indicating or measuring device of the type described in connection with the exemplifications of the invention shown in Figs. 1 to 16. Thus, as shown in Figs. 17 and 18, instead of a mechanical rewinding mechanism for the timing clockwork 52, an electrical rewinding mechanism may be used. It comprises a driving electro-magnet formed of a magnet core 185 and an actuation coil 186 supported on bracket arms 187 extending from the timing mechanism 52 for actuating a rotary armature member 188 affixed to the timer winding shaft 51 and having pole pieces 189 which in the normal position of the mechanism are angularly offset with respect to the cooperating pole faces of the actuating magnet core 185. The timing clockwork with its shaft 51 and the actuating magnet 185 are so arranged that upon energization of the magnet coil 186, the armature pole pieces 189 are pulled to the dotted line position 189' so as to impart to the winding shaft 51 a rotation which is sufficient for rewinding the timing mechanism and restore the clockwork spring to its fully charged condition required for performing the timing action, as described above.

The electro-magnetic driving mechanism is so arranged that when the timing mechanism is released to perform its timing action, for instance, for turning its timing pin 93 from the locked position shown in Fig. 5 to its end position shown in Fig. 12, the armature poles 189 move back to the normal full line position shown in Fig. 18. The energization of the driving magnet 185 is effected by an energizing circuit, which as shown, may consist of a battery 190 having one grounded pole and connected through coil 186 and contacts 191, 192 of a contactor to a conventionally indicated ground. As shown in Fig. 17, the closing of the contacts 191, 192 may be effected by a lever 83' arranged to be controlled and to operate in a way similar to the coupling lever 83 of the mechanisms associated with the indicator and timing clockwork described in connection with Figs. 1 to 13. In the exemplifications of the invention described above, the indicator driving disc acts as a position member which is moved by the driving means in accordance with the speed of the vehicle to a position corresponding to the momentary speed of the vehicle. The indicator with its ratchet are arranged to be biased so as to follow the motion of the driving disc or speed position member to its different positions determined by the momentary speed. The index member is also subjected to the action of its ratchet wheel mechanism which acts as a means for preventing the index member from following the motion of its driving member upon the occurrence of a speed decrease. The preventive action of the ratchet mechanism is subjected to a controlling action exercised by the timing means which are operated in a predetermined manner upon the occurrence of a speed decrease for removing the preventive action of the preventing means after a predetermined timing action, for instance, one or two minutes, during which timing period the speed index member is retained in its maximum speed position.

Although devices embodying the features of the invention may be constructed to operate with various types of timing mechanisms, the exemplifications of the invention described above uses a simple standard spring driven clockwork mechanism which is so arranged that the driving means which actuate the speed indicating mechanism are also used for charging the spring clockwork with the energy required for operating the timing mechanism, each time the timing mechanism is called into action and uses up a part of its energy charge. To control the operation of the timing mechanism and its recharging mechanism, the position member which is arranged to move to the position corresponding to the momentary speed is combined with selectively acting coupling means for starting the timing action in predetermined correlation to the occurrence of a speed decrease. The timing means is combined with means for automatically starting a timer recharging action upon the completion of the timing action. In addition, the timer mechanism is subjected to the supplemental controlling action of selectively acting coupling means associated with the position member for bringing about a recharge of the timing mechanism if a speed increase follows a speed decrease before the completion of a timing action.

The exemplifications of the invention described above will suggest to those skilled in the art many other arrangements and ways for utilizing the motion of an index driving member in its movement to different positions corresponding to the momentary speed for controlling the action of a timing mechanism in retaining a maximum speed indication for a predetermined timing period after a speed decrease follows a speed increase, and the various other novel features underlying the invention.

It is accordingly desired that in construing the breadth of the appended claims, they shall not be limited to the specific details shown and described in connection with the exemplifications of the invention.

I claim:

1. In a speed measuring device, driving means moving at the rate of speed to be measured; a position member moved by said driving means to a position corresponding to the momentary speed; measuring means having a measuring member movable by said position member to positions corresponding to different measured speeds, and inluding means urging said measuring member to follow the motion of said position member under conditions of increasing and decreasing speeds; and preventing means for preventing said measuring member from following the motion of said position member upon the occurrence of a speed decrease, including means actuated in response to a speed decrease and operative to remove the preventive action of said preventing means after a predetermined timing action.

2. In a speed measuring device, driving means moving at the rate of speed to be measured; a position member moved by said driving means to a position corresponding to the momentary speed; a measuring member movable by said position member to positions corresponding to different measured speeds, and including means urging said measuring member to follow the motion of said position member under conditions of increasing and decreasing speeds; preventing means for preventing said measuring member from following the motion of said position member upon the occurrence of a speed decrease, including timing means actuated in response to a speed decrease and operative to remove the preventive action of said preventing means after a predetermined timing action; and charging means actuated in predetermined relation to the timing action for supplying to said timing means energy required for operating said timing means.

3. In a speed measuring device operated by a moving vehicle, driving means moving at the rate of speed to be measured; a position member moved by said driving means along a predetermined path to a position corresponding to the momentary speed; a measuring member movable by said position member to positions corresponding to different measured speeds, and including biasing means urging said measuring member to follow the motion of said position member under conditions of increasing and decreasing speeds; preventing means for preventing said measuring member from following the motion of said position member upon the occurrence of a speed decrease, including energy charged timing means actuated in response to a speed decrease and operative to remove the preventive action of said preventing means after a predetermined timing action; and charging means actuated in a predetermined manner in relation to the completion of the timing action for supplying to said timing means energy required for operating said timing means.

4. In a speed measuring device operated by a moving vehicle, driving means moving at the rate of speed to be measured; a position member moved by said driving means along a predetermined path to a position corresponding to the momentary speed; a measuring member movable by said position member to positions corresponding to different measured speeds, and including biasing means urging said measuring member to follow the motion of said position member under conditions of increasing and decreasing speeds; preventing means for preventing said measuring member from following the motion of said position member upon the occurrence of a speed decrease, including energy charged timing means actuated in response to a speed decrease and operative to remove the preventive action of said preventing means after a predetermined timing action; and charging means actuated in a predetermined manner in relation to the occurrence of a speed increase during the timing action for supplying to said timing means energy required for operating said timing means.

5. In a speed measuring device operated by a moving vehicle, driving means moving at the rate of speed to be measured; a position member moved by said driving means along a predetermined path to a position corresponding to the momentary speed; a measuring member movable by said position member to positions corresponding to different measured speeds, and including biasing means urging said measuring member to follow the motion of said position member under conditions of increasing and decreasing speeds; preventing means for preventing said measuring member from following the motion of said position member upon the occurrence of a speed decrease, including energy charged timing means actuated in response to a speed decrease and operative to remove the preventive action of said preventing means after a predetermined timing action; and charging means actuated in a predetermined manner in relation to the completion of the timing action and upon the occurrence of a speed increase during the timing action for supplying to said timing means energy required for operating said timing means.

6. In a speed measuring device operated by a moving vehicle, driving means moving at the rate of speed to be measured; a position member moved by said driving means along a predetermined path to a position corresponding to the momentary speed; a measuring member movable by said position member to positions corresponding to different measured speeds, and including biasing means urging said measuring member to follow the motion of said position member under conditions of increasing and decreasing speeds; preventing means for preventing said measuring member from following the motion of said position member upon the occurrence of a speed decrease, including energy charged timing means actuated in response to a speed decrease and operative to remove the preventive action of said preventing means after a predetermined timing action; and charging means actuated in predetermined relation to the timing action for causing said driving means to supply to said timing means energy required for operating said timing means.

7. In a speed measuring device operated by a moving vehicle, driving means moving at the rate of speed to be measured; a position member moved by said driving means along a predetermined path to a position corresponding to the momentary speed; a measuring member movable by said position member to positions corresponding to different measured speeds, and including biasing means urging said measuring member to follow the motion of said position member under conditions of increasing and decreasing speeds; preventing means for preventing said measuring member from following the motion of said position member upon the occurrence of a speed decrease, including energy charged timing means actuated in response to a speed decrease and operative to remove the preventive action of said preventing means after a predetermined timing action; and charging means actuated in a predetermined manner in relation to the completion of the timing action for causing said driving means to supply to said timing means energy required for operating said timing means.

8. In a speed measuring device operated by a moving vehicle, driving means moving at the rate of speed to be measured, a position member moved by said driving means along a predetermined path to a position corresponding to the momentary speed; a measuring member movable by said position member to positions corresponding to different measured speeds, and including biasing means urging said measuring member to follow the motion of said position member under conditions of increasing and decreasing speeds; preventing means for preventing said measuring member from following the motion of said position member upon the occurrence of a speed decrease, including energy charged timing means actuated in response to a speed decrease and operative to remove the preventive action of said preventing means after a predetermined timing action; and charging means actuated in a predetermined manner in relation to the occurrence of a speed increase during the timing action for causing said driving means to supply to said timing means energy required for operating said timing means.

9. In a speed measuring device operated by a moving vehicle, driving means moving at the rate of speed to be measured; a position member moved by said driving means along a predetermined path to a position corresponding to the momentary speed; a measuring member movable by said position member to positions corresponding to different measured speeds, and including biasing means urging said measuring member to follow the motion of said position member under conditions of increasing and decreasing speeds; preventing means for preventing said measuring member from following the motion of said position member upon the occurrence of a speed decrease, including energy charged timing means actuated in response to a speed decrease and operative to remove the preventive action of said preventing means after a predetermined timing action; and charging means actuated in a predetermined manner in relation to the completion of the timing action and the occurrence of a speed increase during the timing action for causing said driving means to supply to said timing means energy required for operating said timing means.

10. In a speed measuring device operated by a moving vehicle, driving means moving at the rate of speed to be measured; a position member moved by said driving means along a predetermined path to a position corresponding to the momentary speed; a measuring member movable by said position member to positions corresponding to different measured speeds, and including biasing means urging said measuring member to follow the motion of said position member under conditions of increasing and decreasing speeds; preventing means for preventing said measuring member from following the motion of said position member upon the occurrence of a speed decrease; timing means including a driving spring actuated in response to a speed decrease and operative to remove the preventive action of said preventing means after a predetermined timing period; and charging means including normally open coupling means actuated in predetermined relation to the timing action for storing in said spring energy required for driving said timing means.

11. In a speed measuring device operated by a moving vehicle, driving means moving at the rate of speed to be measured; a position member moved by said driving means along a predetermined path to a position corresponding to the momentary speed; a measuring member movable by said position member to positions corresponding to different measured speeds, and including biasing means urging said measuring member to follow the motion of said position member under conditions of increasing and decreasing speeds; preventing means for preventing said measuring member from following the motion of said position member upon the occurrence of a speed decrease; timing means including a driving spring actuated in response to a speed decrease and operative to remove the preventive action of said preventing means after a predetermined timing period; and charging means including coupling means actuated in predetermined relation to the timing action to store in said spring energy required for driving said timing means.

12. In a speed measuring device operated by a moving vehicle, driving means moving at the rate of speed to be measured; a position member moved by said driving means along a predetermined path to a position corresponding to the momentary speed; a measuring member movable by said position member to positions corresponding to different measured speeds, and including biasing means urging said measuring member to follow the motion of said position member under conditions of increasing and decreasing speeds; preventing means for preventing said measuring member from following the motion of said position member upon the occurrence of a speed decrease; timing means including a driving spring actuated in response to a speed decrease and operative to remove the preventive action of said preventing means after a predetermined timing period; and charging means including normally open coupling means actuated in a predetermined manner in relation to completion of the timing action for storing in said spring energy required for driving said timing means.

13. In a speed measuring device operated by a moving vehicle, driving means moving at the rate of speed to be measured; a position member moved by said driving means along a predetermined path to a position corresponding to the momentary speed; a measuring member movable by said position member to positions corresponding to different measured speeds, and including biasing means urging said measuring member to follow the motion of said position member under conditions of increasing and decreasing speeds; preventing means for preventing said measuring member from following the motion of said position member upon the occurrence of a speed decrease; timing means including a driving spring actuated in response to a speed decrease and operative to remove the preventive action of said preventing means after a predetermined timing period; and charging means including normally open coupling means actuated in a predetermined manner in relation to the occurrence of a speed increase during the timing action for storing in said spring energy required for driving said timing means.

14. In a speed measuring device operated by a moving vehicle, driving means moving at the rate of speed to be measured; a position member moved by said driving means along a predetermined path to a position corresponding to the momentary speed; a measuring member movable by said position member to positions corresponding to different measured speeds, and including biasing means urging said measuring member to follow the motion of said position member under conditions of increasing and decreasing speeds; preventing means for preventing said measuring member from following the motion of said position member upon the occurrence of a speed decrease; timing means including a driving spring actuated in response to a speed decrease and operative to remove the preventive action of said preventing means after a predetermined timing period; and charging means including normally open coupling means actuated in a predetermined manner in relation to the timing action and the occurrence of a speed increase during the timing action for storing in said spring energy required for driving said timing means.

15. In a speed measuring device, driving means moving at the rate of speed to be measured; a position member moved by said driving means to a position corresponding to the momentary speed; measuring means having a measuring member movable by said position member to positions corresponding to different measured speeds, and including means urging said measuring member to follow the motion of said position member under conditions of increasing and decreasing speeds; preventing means for preventing said measuring member from following the motion of said position member upon the occurrence of a speed decrease, including means actuated in response to a speed decrease and operative to remove the preventive action of said preventing means after a predetermined timing action; a relatively stationary measuring member cooperating with said movable measuring member, said movable measuring member and said relatively stationary measuring member having cooperating surface elements correlated to give in each position a measure of the speed condition; and a pressure member for forcing a sheet to be imprinted against the surface elements of said measuring members.

16. In a speed measuring device, driving means moving at the rate of speed to be measured; a position member moved by said driving means to a position corresponding to the momentary speed; measuring means having a measuring member movable by said position member to positions corresponding to different measured speeds, and including means urging said measuring member to follow the motion of said position member under conditions of increasing and decreasing speeds; preventing means for preventing said measuring member from following the motion of said position member upon the occurrence of a speed decrease, including means actuated in response to a speed decrease and operative to remove the preventive action of said preventing means after a predetermined timing action; a relatively stationary measuring member cooperating with said movable measuring member, said movable measuring member and said relatively stationary measuring member having cooperating surface elements correlated to give in each position a measure of the speed condition; a pressure member for forcing a sheet to be imprinted against the surface elements of said measuring members; and means for actuating said pressure member to apply a predetermined limited pressure against said surfaces for performing a printing operation while preventing the application of excessive pressure to said surfaces.

17. In a speed measuring device, driving means moving at the rate of speed to be measured; a position member moved by said driving means to a position corresponding to the momentary speed; measuring means having a measuring member movable by said position member to positions corresponding to different measured speeds, and including means urging said measuring member to follow the motion of said position member under conditions of increasing and decreasing speeds; preventing means for preventing said measuring member from following the motion of said position member upon the occurrence of a speed decrease, including means actuated in response to a speed decrease and operative to remove the preventive action of said preventing means after a predetermined timing action; a relatively stationary measuring member cooperating with said movable measuring member, said movable measuring member and said relatively stationary measuring member having cooperating surface elements correlated to give in each position a measure of the speed condition; a pressure member for forcing a sheet to be imprinted against the surface elements of said measuring members; means for actuating said pressure member to apply a predetermined limited pressure against said surfaces for performing a printing operation while preventing the application of excessive pressure to said surfaces; and a closure member enclosing a narrow space overlying said surface elements, said closure member being so shaped and arranged as to confine the space facing said surface elements to a narrow slot arranged to receive sheets inserted in the slot while protecting the surface elements against tampering.

18. In a speed measuring device, driving means moving at the rate of speed to be measured; a position member moved by said driving means to a position corresponding to the momentary speed; a measuring member movable by said position member to positions corresponding to different measured speeds, and including means urging said measuring member to follow the motion of said position member under conditions of increasing and decreasing speeds; preventing means for preventing said measuring member from following the motion of said position member upon the occurrence of a speed decrease, including timing means actuated in response to a speed decrease and operative to remove the preventive action of said preventing means after a predetermined timing action; charging means actuated in predetermined relation to the timing action for supplying to said timing means energy required for operating said timing means; a relatively stationary measuring member cooperating with said movable measuring member, said movable measuring member and said relatively stationary measuring member having cooperating surface elements correlated to give in each position a measure of the speed condition; and a pressure member for forcing a sheet to be imprinted against the surface element of said measuring members.

19. In a speed measuring device, driving means moving at a rate of speed to be measured; a position member moved by said driving means to a position corresponding to the momentary speed; a measuring member movable by said position member to positions corresponding to different measured speeds, and including means urging said measuring member to follow the motion of said position member under conditions of increasing and decreasing speeds; preventing means for preventing said measuring member from following the motion of said position member upon the occurrence of a speed decrease, including timing means actuated in response to a speed decrease and operative to remove the preventive action of said preventing means after a predetermined timing action; charging means actuated in predetermined relation to the timing action for supplying to said timing means energy required for operating said timing means; a relatively stationary measuring member cooperating with said movable measuring member, said movable measuring member and said relatively stationary measuring member having cooperating surface elements correlated to give in each position a measure of the speed condition; a pressure member for forcing a sheet to be imprinted against the surface element of said measuring members; and means for actuating said pressure member to apply a predetermined limited pressure against said surfaces for performing a printing operation while preventing the application of excessive pressure to said surfaces.

20. In a speed measuring device, driving means moving at the rate of speed to be measured; a position member moved by said driving means to a position corresponding to the momentary speed; a measuring member movable by said position member to positions corresponding to different measured speeds, and including means urging said measuring member to follow the motion of said position member under conditions of increasing and decreasing speeds; preventing means for preventing said measuring member from following the motion of said position member upon the occurrence of a speed decrease, including timing means actuated in response to a speed decrease and operative to remove the preventive action of said preventing means after a predetermined timing action; charging means actuated in predetermined relation to the timing action for supplying to said timing means energy required for operating said timing means; a relatively stationary measuring member cooperating with said movable measuring member, said movable measuring member and said relatively stationary measuring member having cooperating surface elements correlated to give in each position a measure of the speed condition; a pressure member for forcing a sheet to be imprinted against the surface element of said measuring members; means for actuating said pressure member to apply a predetermined limited pressure against said surfaces for performing a printing operation while preventing the application of excessive pressure to said surfaces; and a closure member enclosing a narrow space overlying said surface elements, said closure member being so shaped and arranged as to confine the space facing said surface elements to a narrow slot arranged to receive sheets inserted in the slot while protecting the surface elements against tampering.

EMMANUEL CHRIST NICHOLIDES.